May 19, 1959
R. J. F. J. BEGÚE
2,887,337
GARDEN IMPLEMENT
Filed Nov. 7, 1957
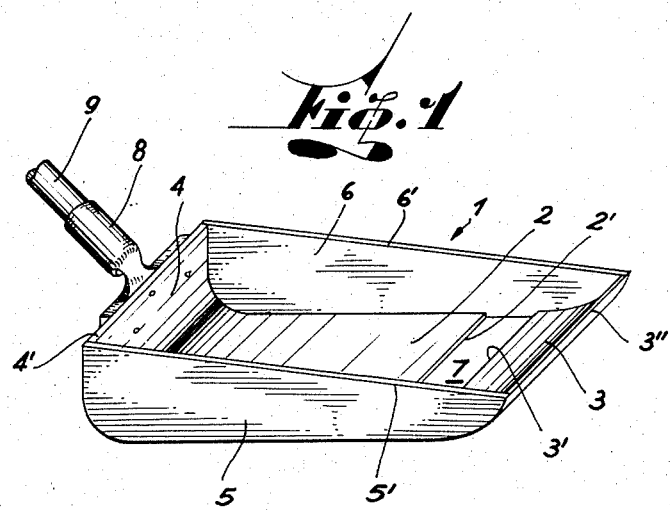
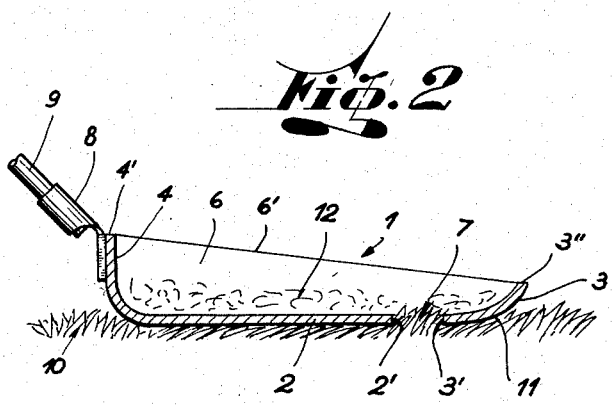
INVENTOR.
RENÉ J. F. J. BEGUÉ
BY
Mason, Fenwick & Lawrence
Attorneys

United States Patent Office 2,887,337
Patented May 19, 1959

2,887,337
GARDEN IMPLEMENT
René J. F. J. Bégué, Cordoba, Argentina

Application November 7, 1957, Serial No. 695,077

3 Claims. (Cl. 294—55)

This invention relates to a garden implement for collecting dead leaves, grass cuttings and the like from a lawn or the like.

Grass cuttings and the like are nowadays removed from a lawn by means of a rake or a wire-toothed rake of the type having elastic prongs.

With these known tools it is possible to collect rather larger cuttings or clippings, but it is somewhat difficult to collect grass cuttings and small particles, and in addition it quite often happens that the prongs get entangled with the stems of bushes and the like.

To overcome these difficulties and drawbacks, a garden implement for collecting dead leaves, grass cuttings and the like from the lawn or the like, has been conceived, consisting in a shovel-like member having a base portion including a front end deflector portion, a wall portion integral with and substantially surrounding said base portion with the exception of said front end deflector portion, and an opening in said base portion behind said front end deflector portion for collecting said dead leaves and the like upon sliding said base portion along the lawn or the like.

With this implement, the gass stems and leaves are pressed down by the front end deflector portion upon sliding the base portion along the lawn and when said grass and leaves enter said opening in said base portion, they rise through the opening, thereby projecting the loose cuttings, clippings, dead leaves and the like, into the shovel.

It is therefore, an object of the present invention, to provide a garden implement by means of which it is easy and simple to collect cuttings and the like.

A further object is to provide a garden implement of simple structure and low manufacturing cost.

These, and further objects and advantages of the present invention will become more apparent during the course of the following description, wherein by way of example a preferred embodiment is described in relationship to the accompanying drawings.

In the drawings:

Figure 1 is a perspective view of a garden implement in accordance with the present invention, wherein only part of the handle is shown.

Figure 2 shows the same garden implement as Figure 1, but in longitudinal section and in operative position on a lawn.

As may be seen in Figures 1 and 2, the garden implement of the present invention consists of a shovel-like member 1, having a base portion 2, a front end deflector portion 3 which is concavely shaped and upwardly inclined, and also a rear wall portion 4 which defines a wall portion rigidly connected to the side wall portions 5 and 6, thereby encircling the base portion 2.

The front end deflector portion 3 is also rigidly connected to the side wall portions 5 and 6 and between the rear or trailing edge 3' of the front end deflector portion 3, and the free edge 2' of the base portion 2, a rectangular opening 7 is defined which is laterally limited by the side wall portions 5 and 6. The free edge 3'' of the front end deflector portion 3 is preferably arranged in the same plane as the upper edges 4', 5' and 6' of the rear wall portion 4 and the side wall portions 5 and 6, respectively.

The rear wall portion 4 supports a socket member 8 in which a handle 9 is fastened, as is already well known in the art.

In operation, the shovel-like member 1 is pushed along a lawn 10 (see Figure 2) by means of the handle 9, whereby front end deflector portion 3 by means of its outer convex face 11 presses the grass, stems and the like down, which will rise the moment they enter opening 7, and by this upward movement will throw the cuttings 12 into the space defined by the shovel-like member 1.

As the implement continues its working path, the grass which rose in the opening 7 is depressed again until the rear wall portion 4 has passed, as will be obvious to anybody skilled in the art.

I claim:

1. A garden implement for collecting debris such as fallen leaves, grass cuttings and the like from a lawn by propelling said implement over said lawn comprising, a base for slidingly engaging said lawn, said base having a free edge and having an upstanding wall on the remaining peripheral edge of said base, an upwardly inclined deflector having a rear edge spaced from and coplanar with the free edge of said base to form an opening transversely of said implement, said deflector being supported by a continuation of said wall, whereby when said implement is moved forwardly with said free edge and adjacent deflector edge in contact with the lawn debris will be deposited in the receptacle formed by said wall and base.

2. In a garden implement for collecting debris such as fallen leaves, grass cuttings and the like from a lawn by slidingly propelling said implement over said law as claimed in claim 1, means operatively coupled with said base to transmit force to said base to impart motion thereto.

3. A garden implement for collecting debris such as fallen leaves, grass cuttings and the like from a lawn by slidingly propelling said implement over said lawn comprising, a flat base portion having a free edge for slidingly engaging said lawn, a rear wall upstanding from said flat base portion, a rearwardly declining deflector portion having a trailing edge in the plane of said flat base portion and having a top edge substantially above the plane of said flat base portion, said trailing edge of said rearwardly declining deflector portion being spaced forwardly from said free edge of said flat base portion to provide a slot through which debris pressingly deflected into said lawn by said rearwardly declining deflector portion will be resiliently rebounded through said slot, and upstanding side walls extending across the side edges of said flat base portion and said rearwardly declining deflector portion.

References Cited in the file of this patent

FOREIGN PATENTS

| 534,859 | France | Apr. 4, 1922 |
| 9,815 | Great Britain | May 11, 1901 |